(12) United States Patent
Friour et al.

(10) Patent No.: US 7,923,082 B2
(45) Date of Patent: Apr. 12, 2011

(54) MOLECULAR IMPRINTED MATERIAL AND INKJET RECORDING ELEMENT COMPRISING SAID MOLECULAR IMPRINTED MATERIAL

(75) Inventors: Gerard A. Friour, Chalon sur Saone (FR); Olivier J. Poncelet, Chalon-sur-Saone (FR); Karsten O. Haupt, Paris (FR); Laurence G. Poul, Paris (FR)

(73) Assignee: Eastman Kodak Company, Rochester, NY (US)

( * ) Notice: Subject to any disclaimer, the term of this patent is extended or adjusted under 35 U.S.C. 154(b) by 1017 days.

(21) Appl. No.: 11/574,740

(22) PCT Filed: Sep. 2, 2005

(86) PCT No.: PCT/EP2005/009471

§ 371 (c)(1),
(2), (4) Date: Mar. 6, 2007

(87) PCT Pub. No.: WO2006/029727

PCT Pub. Date: Mar. 23, 2006

(65) Prior Publication Data

US 2009/0233017 A1 Sep. 17, 2009

(30) Foreign Application Priority Data

Sep. 13, 2004 (FR) .................................... 04 09657

(51) Int. Cl.
*B41M 5/40* (2006.01)

(52) U.S. Cl. ............... 428/32.24; 428/32.25; 428/32.34; 428/32.36

(58) Field of Classification Search ............... 428/32.24, 428/32.25, 32.34, 32.36
See application file for complete search history.

(56) References Cited

U.S. PATENT DOCUMENTS

| 5,856,001 A * | 1/1999 | Okumura et al. .......... 428/32.36 |
| 6,096,469 A | 8/2000 | Anderson et al. |
| 2002/0171730 A1* | 11/2002 | Nakahara et al. ............. 347/105 |

FOREIGN PATENT DOCUMENTS

| EP | 0 619 141 | 10/1994 |
| EP | 0 982 591 | 3/2000 |
| WO | WO 01/90228 A1 * | 11/2001 |

OTHER PUBLICATIONS

Karsten Haupt et al., "Molecularly Imprinted Polymers and Their Use in Biomimetic Sensors," Chemical Reviews, vol. 100, 2000, pp. 2495-2504, XP001064939.

* cited by examiner

*Primary Examiner* — Betelhem Shewareged
(74) *Attorney, Agent, or Firm* — Chris P. Konkol; Andrew J. Anderson

(57) ABSTRACT

The present invention relates to an inkjet recording element having outstanding dye keeping properties in time. Said recording element comprises at least one molecular imprinted polymer having sites of selective recognition of dye molecules corresponding to the dye molecules used in inks for inkjet printing.

20 Claims, 3 Drawing Sheets

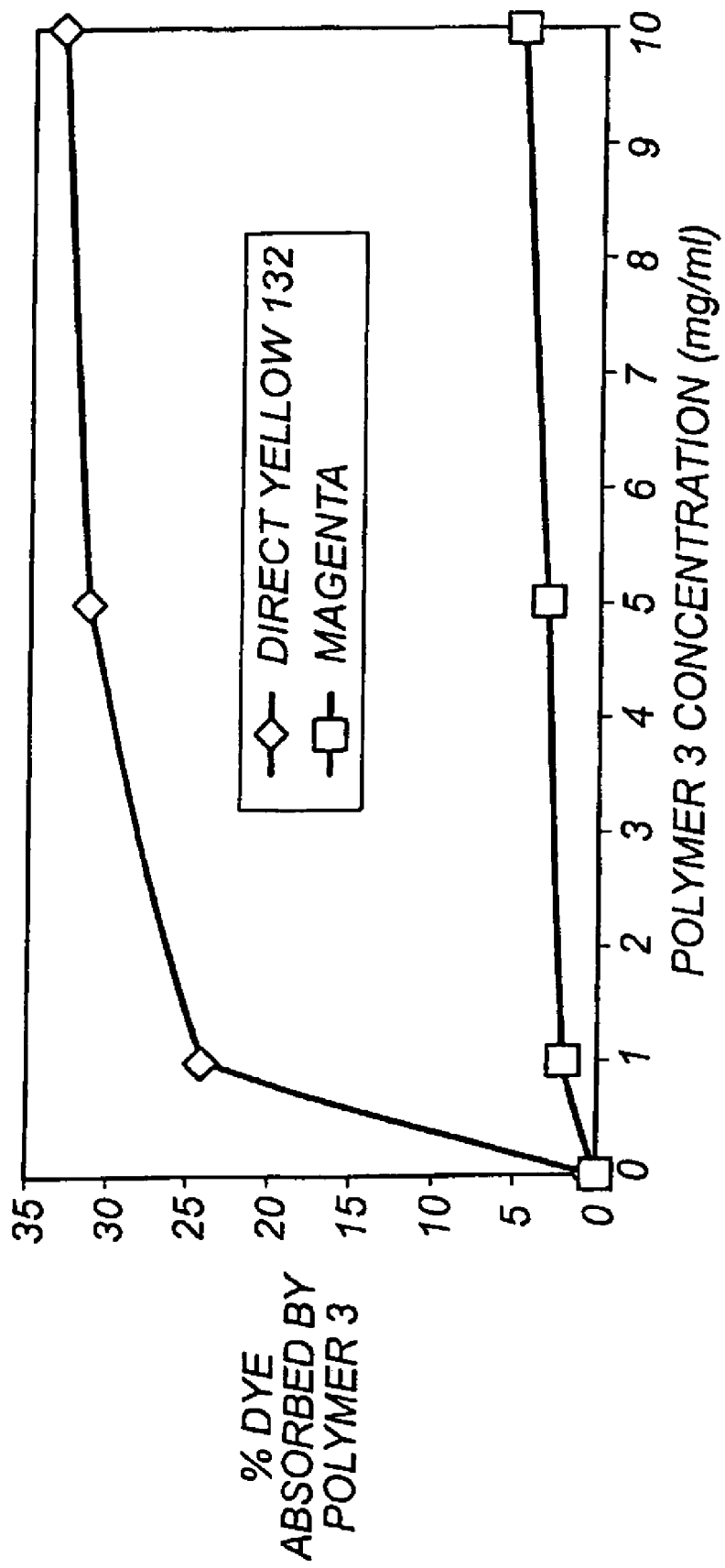

MOLECULAR IMPRINTED MATERIAL AND INKJET RECORDING ELEMENT COMPRISING SAID MOLECULAR IMPRINTED MATERIAL

FIELD OF THE INVENTION

The present invention relates to a molecular imprinted material, which is preferably a polymer, and an inkjet recording element comprising said molecular imprinted material.

BACKGROUND OF THE INVENTION

Digital photography has been growing fast for several years; the general public now having access to efficient and reasonably priced digital cameras. Therefore people are seeking to be able to produce photographic prints from a simple computer and its printer, with the best possible quality.

Many printers, especially those linked to personal office automation, use the inkjet printing technique. There are two major families of inkjet printing techniques: continuous jet and drop-on-demand.

Continuous jet is the simpler system. Pressurized ink ($3.10^5$ Pa) is forced to go through one or more nozzles so that the ink is transformed into a flow of droplets. In order to obtain the most regular possible sizes and spaces between drops, regular pressure pulses are sent using for example a piezoelectric crystal in contact with the ink with high frequency (up to 1 MHz) alternating current (AC) power supply. So that a message can be printed using a single nozzle, every drop must be individually controlled and directed. Electrostatic energy is used for this: an electrode is placed around the inkjet at the place where drops form. The jet is charged by induction and every drop henceforth carries a charge whose value depends on the applied voltage. The drops then pass between two deflecting plates charged with the opposite sign and then follow a given direction, the amplitude of the movement being proportional to the charge carried by each of the plates. To prevent other drops from reaching the paper, they are left uncharged: so, instead of going to the support they continue their path without being deflected and go directly into a container. The ink is then filtered and can be reused.

The other category of inset printer is drop-on-demand (DOD). This constitutes the base of inkjet printers used in office automation. With this method, the pressure in the ink cartridge is not maintained constant but is applied when a character has to be formed. In one widespread system there is a row of 12 open nozzles, each of them being activated with a piezoelectric crystal. The ink contained in the head is given a pulse: the piezo element contracts with an electric voltage, which causes a decrease of volume, leading to the expulsion of the drop by the nozzle. When the element resumes its initial shape, it pumps in the reservoir the ink necessary for new printings. The row of nozzles is thus used to generate a column matrix, so that no deflection of the drop is necessary. One variation of this system consists in replacing the piezoelectric crystals by small heating elements behind each nozzle. The drops are ejected following the forming of bubbles of solvent vapor. The volume increase enables the expulsion of the drop. Finally, there is a pulsed inkjet system in which the ink is solid at ambient temperature. The print head thus has to be heated so that the ink liquefies and can print. This enables rapid drying on a wider range of products than conventional systems.

There now exist new "inkjet" printers capable of producing photographic images of excellent quality. However, they cannot supply good proofs if inferior quality printing paper is used. The choice of printing paper is fundamental for the quality of obtained image. The printing paper must combine the following properties: high quality printed image, rapid drying after printing, good dye keeping in time, smooth appearance, and high gloss.

In general, the printing paper comprises a support coated with one or more layers according to the properties required. It is possible, for example, to apply on a support a primary attachment layer, an absorbent layer, an ink dye fixing layer and a protective layer or surface layer to provide the glossiness of the recording element. The absorbent layer absorbs the liquid part of the water-based ink composition after creation of the image. Elimination of the liquid reduces the risk of ink migration to the surface. The ink dye fixing layer prevents any dye loss into the fibers of the paper base to obtain good color saturation while preventing excess ink that would encourage the increase in size of the printing dots and reduce the image quality. The absorbent layer and fixing layer can also constitute a single ink-receiving layer ensuring both functions. The protective layer is designed to ensure protection against fingerprints and the pressure marks of the printer feed rollers. The ink-receiving layer usually comprises a binder, a receiving agent and various additives. The purpose of the receiving agent is to fix the dyes in the printing paper. The best-known inorganic receivers are colloidal silica or boehmite. For example, the European Patent Applications EP-A-976,571 and EP-A-1,162,076 describe materials for inkjet printing in which the ink-receiving layer contains as inorganic receivers Ludox™ CL (colloidal silica) marketed by Grace Corporation or Dispal™ (colloidal boehmite) marketed by Sasol. However, printing paper comprising an ink-receiving layer containing such inorganic receivers can have poor image stability in time, which is demonstrated by a loss of color density.

To meet the new requirements of the market in terms of photographic quality, printing speed and color stability, it is necessary to offer a new inkjet recording element having the properties as defined above, more particularly good dye keeping in time.

SUMMARY OF THE INVENTION

The new inkjet recording element to the present invention, is characterized in that it comprises at least one molecular imprinted material having sites of selective recognition of dye molecules corresponding to the dye molecules used in the ink.

The present invention also relates to a molecular imprinted material having sites of selective recognition of dye molecules corresponding to the dye molecules used in inks for inkjet printing.

The present invention also relates to a preparation method of a molecular imprinted material having sites of selective recognition of dye molecules corresponding to the dye molecules used in inks for inkjet printing comprising the following steps:
 a) synthesizing the molecular imprinted material in the presence of template molecules with similar or identical structure to the dye molecules used in inks for inkjet printing,
 b) extracting the template molecules from the molecular imprinted material to form recognition sites of said dye molecules.

The present invention also relates to a method for improving the image stability of an inkjet recording element, consisting in using molecular imprinted materials having sites of selective recognition of dye molecules corresponding to the dye molecules used in the ink.

Preferably, the molecular imprinted material is a polymer.

The use of molecular imprinted materials having sites of selective recognition of the dye molecules contained in the ink enables the creation of a related ink-printing paper system, the printing paper then having a selectivity for the dyes contained in the related printing inks. This selectivity causes a strong interaction between the dyes and the paper. Therefore, the inkjet recording element according to the present invention has good dye keeping properties in time.

BRIEF DESCRIPTION OF THE DRAWINGS

FIG. 3 represents the percentage of adsorbed dyes according to the concentration in imprinted polymer.

DETAILED DESCRIPTION OF THE INVENTION

Figure 1:
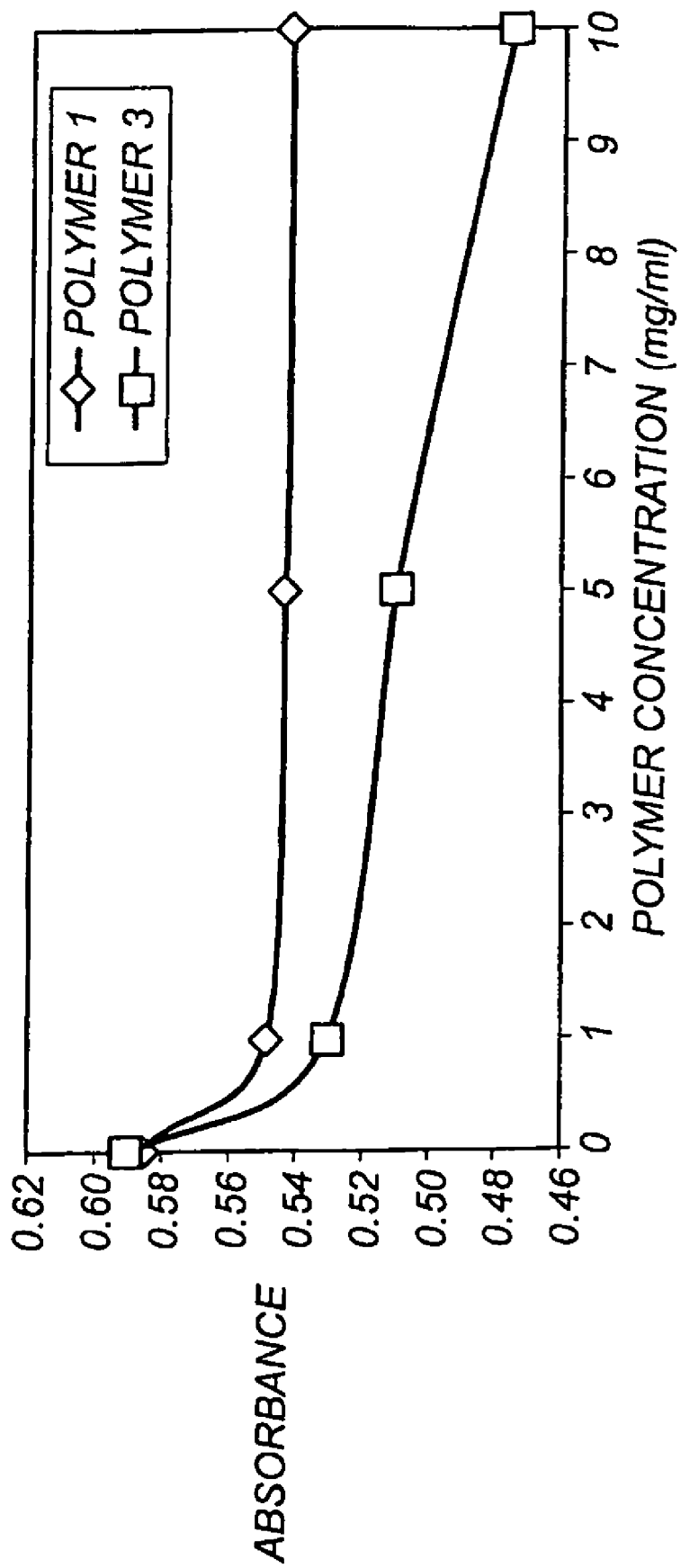
FIGS. 1 and 2 represent the concentration in non-adsorbed dye according to the polymer concentration.

The inkjet recording element according to the present invention comprises firstly a support. This support is selected according to the desired use. It can be a transparent or opaque thermoplastic film, in particular a polyester base film such as polyethylene terephthalate or polymethylmetacrylate; cellulose derivatives, such as cellulose ester, cellulose triacetate, cellulose diacetate; polyacrylates; polyimides; polyamides; polycarbonates; polystyrenes; polyolefines; polysulfones; polyetherimides; vinyl polymers such as polyvinyl chloride; and their mixtures. The support used in the invention can also be paper, both sides of which may be covered with a polyethylene layer. When the support comprising the paper pulp is coated on both sides with polyethylene, it is called Resin Coated Paper (RC Paper) and is marketed under various brand names. This type of support is especially preferred to constitute an inkjet recording element. The side of the support that is used can be coated with a very thin layer of gelatin or another composition to ensure the adhesion of the first layer on the support.

According to the present invention, the inkjet recording element comprises at least one molecular imprinted material having sites of selective recognition of dye molecules corresponding to the dye molecules used in the printing ink.

Preferably, the molecular imprinted material is a molecular imprinted polymer.

Molecular Imprinted Polymers (MIPs) are obtained by polymerization of functional monomers, with or without cross-linker, in the presence of template molecules. A template molecule is a molecule with similar or identical structure to the dye molecules used in inks for inkjet printing. The template molecule and the corresponding dye molecule are preferably iso-electronic and iso-structural. The template molecule can be for example one of the structural elements of the dye molecule, without itself being colored.

The functional monomers organize specifically around the template molecule, then after polymerization, their functional groups form a highly cross-linked polymer structure. After polymerization, the template molecule is extracted from the polymer. The resulting polymer then has sites that are complementary in size, form or location with the chemical functions of the target dye molecule and capable of recognizing the target dye molecule with very great specificity. The polymer can then selectively adsorb the target dye molecule when it is put into contact with one of them.

The polymers used in the present invention can be organic or inorganic. They can comprise crystalline phases. The organic polymers can be selected from the group consisting of polyacrylics, polymethacrylics, polyvinylics, their esters and copolymers, polyurethanes, polymers from the condensation of amine esters of boronic acid, polyphenols, diamine polyphenylenes, and polypyrroles. The inorganic polymers can be obtained from functional monomers selected from the group consisting of silica, silicon alkoxide and titanium oxide. Preferably, a silicate polymer resulting from the polymerization of silicon alkoxides is used.

In the present invention, the target molecule is a dye molecule used in inks for inkjet printing. The dyes used are generally those directly soluble in water. Conventionally, the dyes used correspond to the colors yellow, magenta and cyan. Dyes useful in the present invention can be the dyes, Direct Blue 199 (CAS 12222-04-7), Direct Yellow 132 (CAS 10114-86-0), Direct Yellow 86 (CAS 50925-42-3), Acid Yellow 17 (CAS 6359-98-4), Acid Yellow 23 (CAS 1934-21-0), Acid Red 52 (CAS 3520-42-1), Reactive Red 180 (CAS 98114-32-0), Sulforhodamine B (CAS 2609-88-3), Rhodamine B (CAS 81-88-9).

According to the present invention, the preparation method of a molecular imprinted polymer having sites of selective recognition of dye molecules corresponding to the dye molecules used in inks for inkjet printing comprises the following steps:
 a) polymerizing the functional monomers in the presence of template molecules with similar or identical structure to the dye molecules used in the inks for inkjet printing,
 b) extracting the template molecules from the polymer to form recognition sites of said dye molecules.

There are two different approaches for developing molecular imprinted systems: (1) the monomers and the template molecule are linked by covalence but reversibly, or (2) the initial interactions between the monomers and the template molecule are not covalent. There are different synthetic pathways for molecular imprinted polymers. One of these is described in the publication, Sasaki, D. Y.; Alam, T. M. *American Chemical Society* 2000, 12, 1400-1407 and uses the sol-gel pathway.

Other synthetic examples are described in the following publications: *Impression covalente de polymères organiques et de surfaces de silice*, Wulff, G., Heide, B., Helfrneier, G. (1986) JACS 108, 1089-1091; *Impression covalente depolymères synthetiques*, Wulff, G., Schauhof, S., (1991) J. Org. Chem. 56, 395-400; Impression non-covalente depolymères synthétiques, Andersson, L. I., Sellergren, B., Mosbach, K. (1984) Tetrahedron Lett. 25, 5211-5214; *Impression covalente et non-covalente combinées de polymères synthétiques*, Klein, J. U., Whitcombe, M. J., Mulholland, F., Vulfson, E. N. (1999) Angew. Chem. Int. Ed. 38, 2057-2060; *On Route to the Chiral Imprinting of Bulk Silica*, S. Ini, J. L. Defreese, N. Parra-Vasquez, A. Katz, Mat. Res. Soc. Symp. Proc. Vol. 723, 41-47, Materials Research Society.

The polymerization can be carried out in the absence of a catalyst by subjecting the reaction mixture to appropriate polymerization parameters, such as light, heat and pressure. If necessary, a catalyst can be used according to the nature of the polymerization. It can also be desirable to include a cross-linking agent in the reaction mixture. The polymerization can be carried out in the presence of a solvent and/or another porogenic agent.

Polymerization reactions and conditions are known to those skilled in the art and do not require special comment.

After the polymerization, the template molecules can be extracted by any known method that enables the template molecule to be removed without destroying the imprinted polymer. The extraction can be performed using a solvent containing or not a competitor agent or require chemical cleavage, such as hydrolysis, acid hydrolysis, alkaline hydrolysis, hydrogenation, reduction or oxidation.

The preparation method of a molecular imprinted polymer having sites of selective recognition of dye molecules according to the invention is used for each dye color. Thus an imprinted polymer capable of selectively recognizing the ink's yellow dye molecules, an imprinted polymer capable of selectively recognizing the ink's magenta dye molecules and an imprinted polymer capable of selectively recognizing the ink's cyan dye molecules are obtained.

These polymers can be introduced into the layers forming the recording element according to the invention according to various structures. The recording element according to the invention can comprise at least one layer including at least one molecular imprinted polymer having sites of selective recognition of dye molecules selected from the group consisting of yellow dyes, magenta dyes and cyan dyes.

For example, the inkjet recording element according to the invention can comprise one layer including a molecular imprinted polymer having sites of selective recognition of yellow dye molecules, one layer including a molecular imprinted polymer having sites of selective recognition of magenta dye molecules, and one layer including a molecular imprinted polymer having sites of selective recognition of cyan dye molecules, in any order. The use of only one or two of these three layers corresponding to each dye color can be planned according to the properties of said dyes.

The inkjet recording element according to the invention can also comprise one layer including a molecular imprinted polymer having sites of selective recognition of yellow dye molecules, a molecular imprinted polymer having sites of selective recognition of cyan dye molecules, and a molecular imprinted polymer having sites of selective recognition of magenta dye molecules. The use of only one or two of these three imprinted polymers corresponding to each dye color can be planned according to the properties of said dyes.

The layer including a molecular imprinted polymer having sites of selective recognition of dye molecules can comprise between 5 percent and 100 percent by weight of molecular imprinted polymer compared with the total weight of the layer in the dry state.

The layer including an imprinted polymer can also comprise at least one hydrosoluble binder. Said hydrosoluble binder can be gelatin or polyvinyl alcohol. The gelatin is that conventionally used in the photographic field. Such a gelatin is described in Research Disclosure, September 1994, No. 36544, part IIA. *Research Disclosure* is a publication of Kenneth Mason Publications Ltd., Dudley House, 12 North Street, Emsworth, Hampshire PO10 7DQ, United Kingdom. The gelatin can be obtained from SKW and the polyvinyl alcohol from Nippon Gohsei, or Air Product under the name Airvol®D 130.

The composition of the coating intended to form the layer including an imprinted polymer is produced by mixing the hydrosoluble binder (if present) and said polymer. The composition can also comprise a surfactant to improve its coating properties, and inorganic fillers such as silica or bohemite. The composition can be layered on the support according to any appropriate coating method, such as blade, knife or curtain coating. The composition is applied with a thickness between approximately 100 μm and 500 μm in the wet state. The composition can be applied on both sides of the support. It is also possible to provide an antistatic or anti-winding layer on the back of the support coated with a layer including an imprinted polymer.

The inkjet recording element according to the invention can comprise, in addition to the layer(s) comprising at least one imprinted polymer, other layers arranged above or below said layer including at least one imprinted polymer. The various layer can comprise any other additives known to those skilled in the art to improve the properties of the resulting image, such as UV radiation absorbers, optical brightening agents, antioxidants, plasticizers, etc.

The inkjet recording element according to the invention has good dye keeping properties in time. It can be used for any type of inkjet printer as well as for all the inks developed for this technology.

The following examples illustrate the present invention without however limiting the scope.

1) Preparation of Non-Imprinted Silicate Polymers (Comparative)

a) A silicate polymer was prepared by sol-gel pathway from tetraethoxisilane to obtain a xerogel with the general formula $SiO_2$ Such a synthesis is described in the publication, Sasaki, D. Y.; Alam, T. M. *American Chemical Society* 2000, 12, 1400-1407.

28 ml of tetraethoxisilane were added to 33 ml of ethanol, stirred and then 28 ml of water and 300 μl of hydrochloric acid 1M were added. The mixture was heated to 75° C. for one and a half hours with stirring, then cooled to ambient temperature, to produce a homogeneous sol. The sol was gelified by adding 3 ml of $NH_4OH$ 0.1 M and leaving it to incubate at 75° C. for 12 hours. A gel was obtained. This gel was cut into pieces and put into suspension in ethanol for washing. The mixture was then subjected to ultrasound and then centrifuged, these two operations being repeated once, then it was dried at 50° C. and finally mechanically crushed. A xerogel was obtained that was then washed several times using acetic acid at 10% in water at 100° C. so as to have the same processing conditions as the examples according to the invention. Thus a white powder corresponding to polymer 1 was obtained.

b) Another silicate polymer was prepared in the following way: 28 ml of tetraethoiysilane were added to 33 ml of ethanol, stirred then 28 ml of water were added. The mixture was heated to 75° C. for one and a half hours with stirring, then cooled to ambient temperature, to produce a homogeneous sol. The sol was gelified by leaving it to incubate at 75° C. for 12 hours. A gel was obtained that was cut into pieces and put into suspension in ethanol. The mixture was then subjected to ultrasound and then centrifuged, these two operations being repeated once, then it was dried at 50° C. and finally mechanically crushed. A xerogel was obtained that was then washed several times with acetic acid at 10% in water at 100° C. to eliminate the dye molecules. Thus a white powder corresponding to polymer 2 was obtained.

2) Preparation of Imprinted Silicate Polymers (Invention)

a) The synthesis described in section 1.a) was repeated, but in the presence of 0.1% by mole of Direct Yellow 132 dye, in aqueous solution, compared with tetraethoxisilane. Direct Yellow 132 dye has the following formula (I):

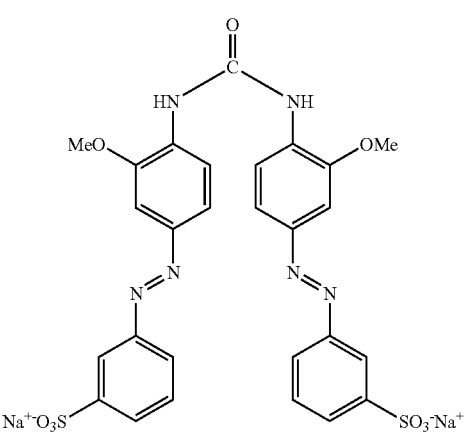

A xerogel was obtained as a white powder corresponding to polymer 3 according to the present invention, which is a molecular imprinted polymer having sites of selective recognition of molecules of Direct Yellow 132 dye.

b) The synthesis described in section 1b) was repeated, but in the presence of 0.1% by mole, compared with the tetraethoxisilane, of an aqueous solution of a Magenta dye, which is a polyvalent complex of transition metal of a 8-heterocyclylazo-5-hydroxyquinoline, and such as described in U.S. Pat. No. 5,997,622 and U.S. Pat. No. 6,001,161. The Magenta dye used in the present invention has the following formula (II):

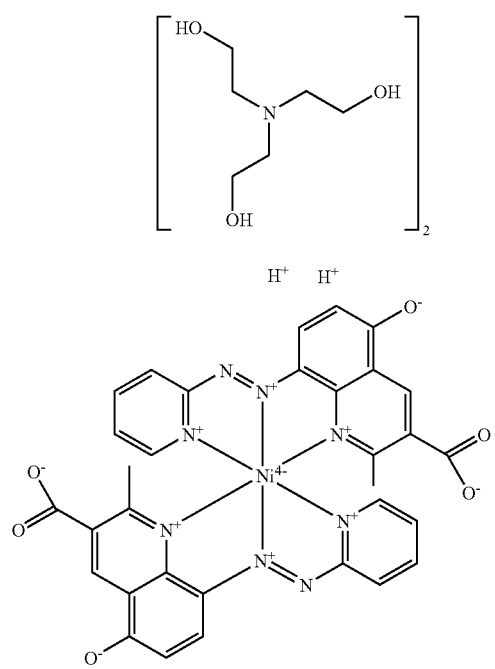

A xerogel was obtained as a white powder corresponding to polymer 4 according to the present invention, which is a molecular imprinted polymer having sites of selective recognition of molecules of Magenta dye.

3) Interactions between the molecular imprinted polymer having sites of selective recognition of molecules of Direct Yellow 132 dye and molecules of Direct Yellow 132 dye.

The imprinted polymer 3 according to the present invention was mixed at various concentrations in water with an aqueous solution of Direct Yellow 132 (formula I) dye at 0.01 g/l. The mixture was left to incubate for 12 hours. After incubation, the solid phase was eliminated by centrifugation. The optical density of the supernatant was measured using a spectrometer at 400 nm to determine the concentration in Direct Yellow 132 dye that was not linked to the imprinted polymer.

The same experiment was repeated with the corresponding non-imprinted polymer 1.

FIG. 1 clearly shows that the concentration in Direct Yellow 132 dye remaining in the supernatant is lower when the yellow dye is put into contact with polymer 3 having sites of selective recognition of molecules of Direct Yellow 132 dye. It may be deduced from this that the Direct Yellow 132 dye has been adsorbed more by polymer 3 according to the present invention having sites of selective recognition of molecules of Direct Yellow 132 dye than by the corresponding non-imprinted polymer 1.

4) Interactions between the Molecular Imprinted Polymer having Sites of Selective Recognition of Molecules of Magenta Dye and Molecules of Magenta Dye.

The imprinted polymer 4 according to the present invention was mixed at various concentrations in water with an aqueous solution of Magenta (formula II) dye at 0.01 g/l. The mixture was left to incubate for 12 hours. After incubation, the solid phase was eliminated by centrifugation and filtration. The optical density of the supernatant was measured using a spectrometer at 553 nm to determine the concentration in Magenta dye that was not linked to the imprinted polymer.

The same experiment was repeated with the corresponding non-imprinted polymer 2.

Figure 2:
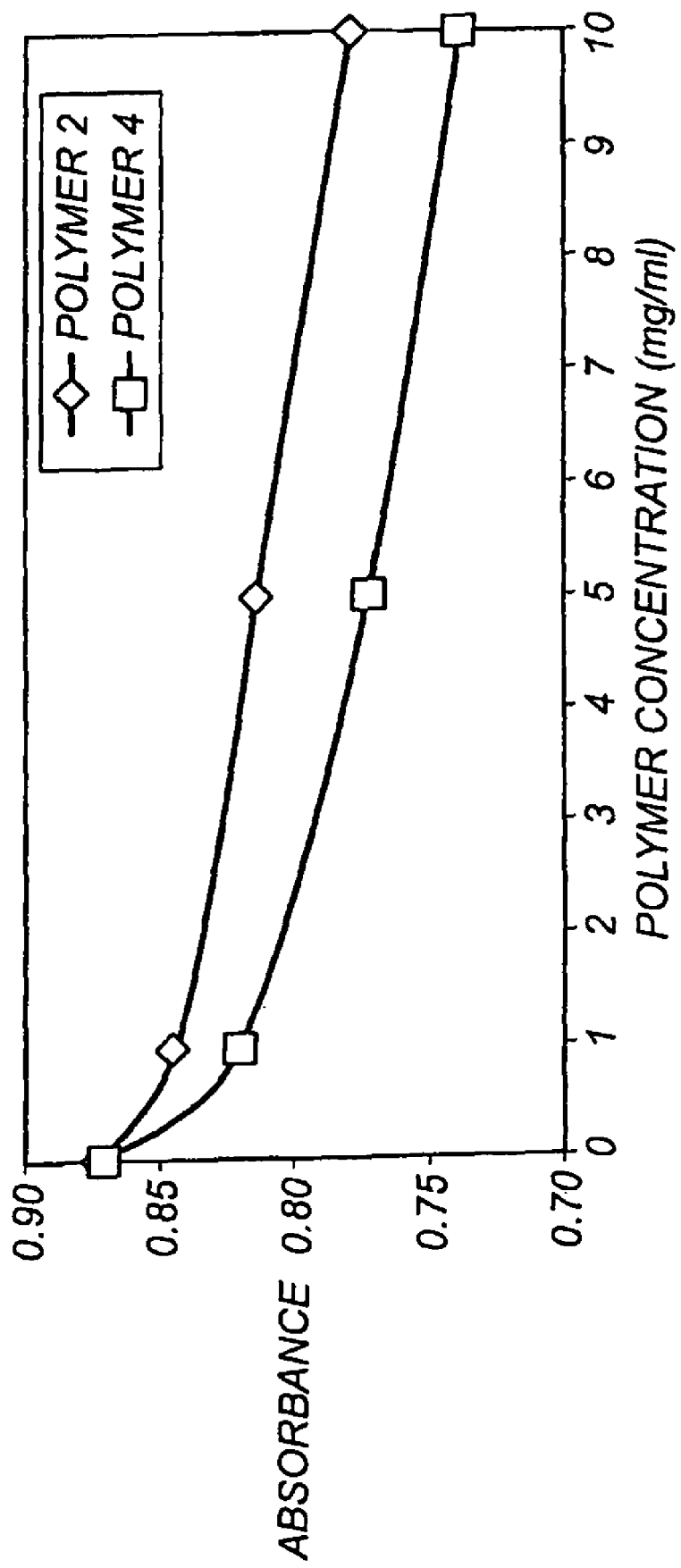

FIG. 2 clearly shows that the concentration in Magenta dye remaining in the supernatant is lower when the Magenta dye is put into contact with polymer 4 having sites of selective recognition of molecules of Magenta dye. It may be deduced from this that the Magenta dye has been adsorbed more by polymer 4 according to the present invention having sites of selective recognition of molecules of Magenta dye than by the corresponding non-imprinted polymer 2.

5) Selectivity of Imprinted Polymers

In this example, the selectivity of the molecular imprinted polymer 3 having sites of selective recognition of molecules of Direct Yellow 132 dye was tested.

For this, the imprinted polymer 3 according to the present invention was mixed at various concentrations in water with an aqueous solution of Direct Yellow 132 (formula I) dye at 0.005 μl and Magenta (formula II) dye at 0.005 μl. The mixture was left to incubate for 12 hours. After incubation, the solid phase was eliminated by centrifugation. The optical density of the supernatant was measured using a spectrometer at 400 nm and 553 nm to determine the concentration in Direct Yellow 132 dye and Magenta dye that was not linked to the imprinted polymer.

FIG. 3 clearly shows that the percentage of Direct Yellow 132 dye adsorbed by polymer 3 having sites of selective recognition of molecules of Direct Yellow 132 dye is undoubtedly greater than the percentage of Magenta dye adsorbed by the same polymer 3. This means that polymer 3 according to the present invention having sites of selective recognition of molecules of Direct Yellow 132 dye is capable of selectively adsorbing molecules of Direct Yellow 132 dye.

6) Inkjet Recording Element a) Preparation of Coating Compositions Constituting an Ink-Receiving Layer Coated on a Support.

As hydrosoluble binder, polyvinyl alcohol was used (Gohsenol™ GH23 marketed by Nippon Gohsei) diluted to 9 percent by weight in osmosed water.

Coating Composition 1:
Coating Composition 1 was Obtained by Mixing:
 2.03 g deionized water
 0.4 g non-imprinted polymer 2
 0.53 g polyvinyl alcohol at 9 percent
The mixture was homogenized using a roller stirrer and five 10-mm diameter glass beads for 20 hours.

Coating Composition 2:
Coating Composition 2 was Obtained by Mixing:
 2.03 g deionized water
 0.4 g imprinted polymer 4
 0.53 g polyvinyl alcohol at 9 percent
The mixture was homogenized using a roller stirrer and five 10-mm diameter glass beads for 20 hours.

b) Preparation of Inkjet Recording Elements.

To do this, a Resin Coated Paper type support was placed on a coating machine, first coated with a very thin gelatin layer, and held on the coating machine by vacuum. This support was coated with a composition as prepared according to paragraph 6.a) using a blade. The wet thickness was 125 μm. It was left to dry for 12 hours at ambient air temperature (21° C.).

The resulting recording elements correspond to the examples shown in Table I below specifying the polymer used in the ink-receiving layer:

TABLE I

| Recording element | Composition | Polymer |
|---|---|---|
| Ex A (comp.) | 1 | Non-imprinted 2 |
| Ex B (inv.) | 2 | Imprinted 4 (Magenta recognition) | c) Evaluation of Dye Keeping Properties in Time.

To evaluate the dye keeping properties in time, a dye fading test by exposure to ozone was performed for each resulting recording element. For this, on each element, a magenta target was printed using a KODAK PPM 200 printer and the related magenta ink including the Magenta dye molecules of formula II. The Magenta ink was printed at maximum density. The targets were analyzed using Gretaglacbeth Spectrolino densitometer. Then the recording elements were placed in the dark in a room with controlled ozone atmosphere (60 ppb) for three weeks. Any deterioration of color density was monitored using the densitometer. The results are given below in Table II.

TABLE II

| Recording element | Magenta loss % |
|---|---|
| Ex A (comp.) | 96 |
| Ex B (inv.) | 76 |

The results given in Table II show that the image printed with the Magenta dye on the recording element according to the invention including polymer 4 according to the present invention having sites of selective recognition of molecules of Magenta dye is more stable over time and has better dye keeping Man the image printed on a comparison recording element not including a polymer having sites of selective recognition of molecules of Magenta dye.

The invention claimed is:

1. An inkjet recording element, characterized in that it comprises at least one molecular imprinted polymer material having sites of selective recognition of dye molecules corresponding to the dye molecules used in the ink.

2. The recording element according to claim 1, wherein it comprises at least one layer including at least one molecular imprinted polymer material having sites of selective recognition of dye molecules selected from the group consisting of yellow dyes, magenta dyes and cyan dyes.

3. The recording element according to claim 2, wherein it comprises one layer including a molecular imprinted polymer material having sites of selective recognition of yellow dye molecules, one layer including a molecular imprinted polymer material having sites of selective recognition of magenta dye molecules, and one layer including a molecular imprinted polymer having sites of selective recognition of cyan dye molecules.

4. The recording element according to claim 2, wherein it comprises one layer including a molecular imprinted polymer material having sites of selective recognition of yellow dye molecules, a molecular imprinted polymer material having sites of selective recognition of cyan dye molecules, and a molecular imprinted polymer material having sites of selective recognition of magenta dye molecules.

5. The recording element according to claim 1, wherein said molecular imprinted polymer is selected from the group consisting of the polyacrylics, polymethacrylics, polyvinylics, their esters and copolymers, polyurethanes, polymers from the condensation of amine esters of boronic acid, polyphenols, diamine polyphenylenes, and polypyrroles.

6. The recording element material according to claim 1, wherein said molecular imprinted polymer is obtained from functional monomers selected from the group consisting of silica, silicon alkoxide and titanium oxide.

7. The recording element according to claim 1, wherein the ink-receiving layer comprises between 5 percent and 100 percent by weight of molecular imprinted materials compared with the total weight of the dry receiving layer.

8. The recording element according to claim 1, wherein the molecular imprinted polymer having sites of selective recognition of dye molecules corresponding to the dye molecules used in the ink is formed by the following steps:
   a) polymerizing functional monomers in the presence of template molecules with similar or identical structure to the dye molecules used in the inks for inkjet printing,
   b) extracting the template molecules from the polymer to form recognition sites of said dye molecules.

9. The recording element according to claim 8, wherein the polymer is selected from the group consisting of polyacrylics, polymethacrylics, polyvinylics, their esters and copolymers, polyurethanes, polymers from the condensation of amine esters of boronic acid, polyphenols, diamine polyphenylenes, and polypyrroles.

10. The recording element according to claim 8, wherein the polymer is obtained from functional monomers selected from the group consisting of silica, silicon alkoxide and titanium oxide.

11. An ink and recording element system, comprising at least one ink containing dye molecules and a recording element according to claim 1 comprising at least one molecular imprinted polymer material having sites of selective recognition of dye molecules contained in the at least one ink.

12. The ink and recording element system according to claim 11, wherein the recording element comprises at least one layer including at least one molecular imprinted polymer material having sites of selective recognition of dye molecules contained in the at least one ink selected from the group consisting of yellow dyes, magenta dyes and cyan dyes.

13. The ink and recording element system according to claim 12, comprising an ink containing yellow dye molecules, an ink containing magenta dye molecules, and an ink containing cyan dye molecules, and wherein the recording element comprises one layer including a molecular imprinted polymer material having sites of selective recognition of the yellow dye molecules, one layer including a molecular imprinted polymer material having sites of selective recognition of the magenta dye molecules, and one layer including a molecular imprinted polymer having sites of selective recognition of the cyan dye molecules.

14. The ink and recording element system according to claim 12, comprising an ink containing yellow dye molecules, an ink containing magenta dye molecules, and an ink containing cyan dye molecules, and wherein the recording element comprises one layer including a molecular imprinted polymer material having sites of selective recognition of the yellow dye molecules, a molecular imprinted polymer material having sites of selective recognition of the cyan dye molecules, and a molecular imprinted polymer material having sites of selective recognition of the magenta dye molecules.

15. The ink and recording element system according to claim 11, wherein said molecular imprinted polymer is selected from the group consisting of the polyacrylics, polymethacrylics, polyvinylics, their esters and copolymers, polyurethanes, polymers from the condensation of amine esters of boronic acid, polyphenols, diamine polyphenylenes, and polypyrroles.

16. The ink and recording element system according to claim 11, wherein said molecular imprinted polymer is obtained from functional monomers selected from the group consisting of silica, silicon alkoxide and titanium oxide.

17. The ink and recording element system according to claim 11, wherein the ink-receiving layer comprises between 5 percent and 100 percent by weight of molecular imprinted materials compared with the total weight of the dry receiving layer.

18. The ink and recording element system according to claim 11, wherein the molecular imprinted polymer having sites of selective recognition of dye molecules corresponding to the dye molecules used in the ink is formed by the following steps:
a) polymerizing functional monomers in the presence of template molecules with similar or identical structure to the dye molecules used in the ink,
b) extracting the template molecules from the polymer to form recognition sites of said dye molecules.

19. The ink and recording element system according to claim 18, wherein the polymer is selected from the group consisting of polyacrylics, polymethacrylics, polyvinylics, their esters and copolymers, polyurethanes, polymers from the condensation of amine esters of boronic acid, polyphenols, diamine polyphenylenes, and polypyrroles.

20. The ink and recording element system according to claim 18, wherein the polymer is obtained from functional monomers selected from the group consisting of silica, silicon alkoxide and titanium oxide.

* * * * *